United States Patent [19]

Lochte

[11] 4,188,050

[45] Feb. 12, 1980

[54] REMOTE-CONTROLLED FLOWLINE CONNECTOR

[75] Inventor: Glen E. Lochte, Cypress, Tex.

[73] Assignee: FMC Corporation, San Jose, Calif.

[21] Appl. No.: 844,564

[22] Filed: Oct. 25, 1977

[51] Int. Cl.² .................................................. F16L 55/00
[52] U.S. Cl. ..................................... 285/24; 166/341;
   285/166; 285/184; 285/302; 283/315; DIG./21
[58] Field of Search ................... 285/18, 315, 24, 27,
   285/DIG. 21, 166, 28, 29, 25, 26, 302, 9 R, 184;
   166/341, 344, 347

[56] References Cited

U.S. PATENT DOCUMENTS

| | | | |
|---|---|---|---|
| 3,554,579 | 1/1971 | Brown | 285/18 |
| 3,732,923 | 5/1973 | Fowler | 285/315 X |
| 3,835,655 | 9/1974 | Oliver | 285/18 |
| 3,874,706 | 4/1975 | Arnold | 285/24 |

FOREIGN PATENT DOCUMENTS

| | | | |
|---|---|---|---|
| 223344 | 8/1959 | Australia | 285/DIG. 21 |
| 51047 | 3/1941 | France | 285/DIG. 21 |

*Primary Examiner*—Dave W. Arole
*Attorney, Agent, or Firm*—Lloyd B. Guernsey; W. William Ritt, Jr.; John F. Verhoeven

[57] ABSTRACT

A remotely controllable connector for releasably interconnecting the ends of two oil well flowlines. The connector comprises two coupling members, one of which is extended into engagement with the other by actuation of fluid cylinders, and ball joints in one or both coupling members to accommodate misalignment of the flowlines. A pair of mating cones mounted on the opposed ends of the two coupling members align the members into proper position during the connecting operation, and clamp means that are activated by remote control secure the two coupling members together in a fluid-tight connection. Seals are then set by remote control to seal all joints and to lock the coupling members in working alignment.

16 Claims, 26 Drawing Figures

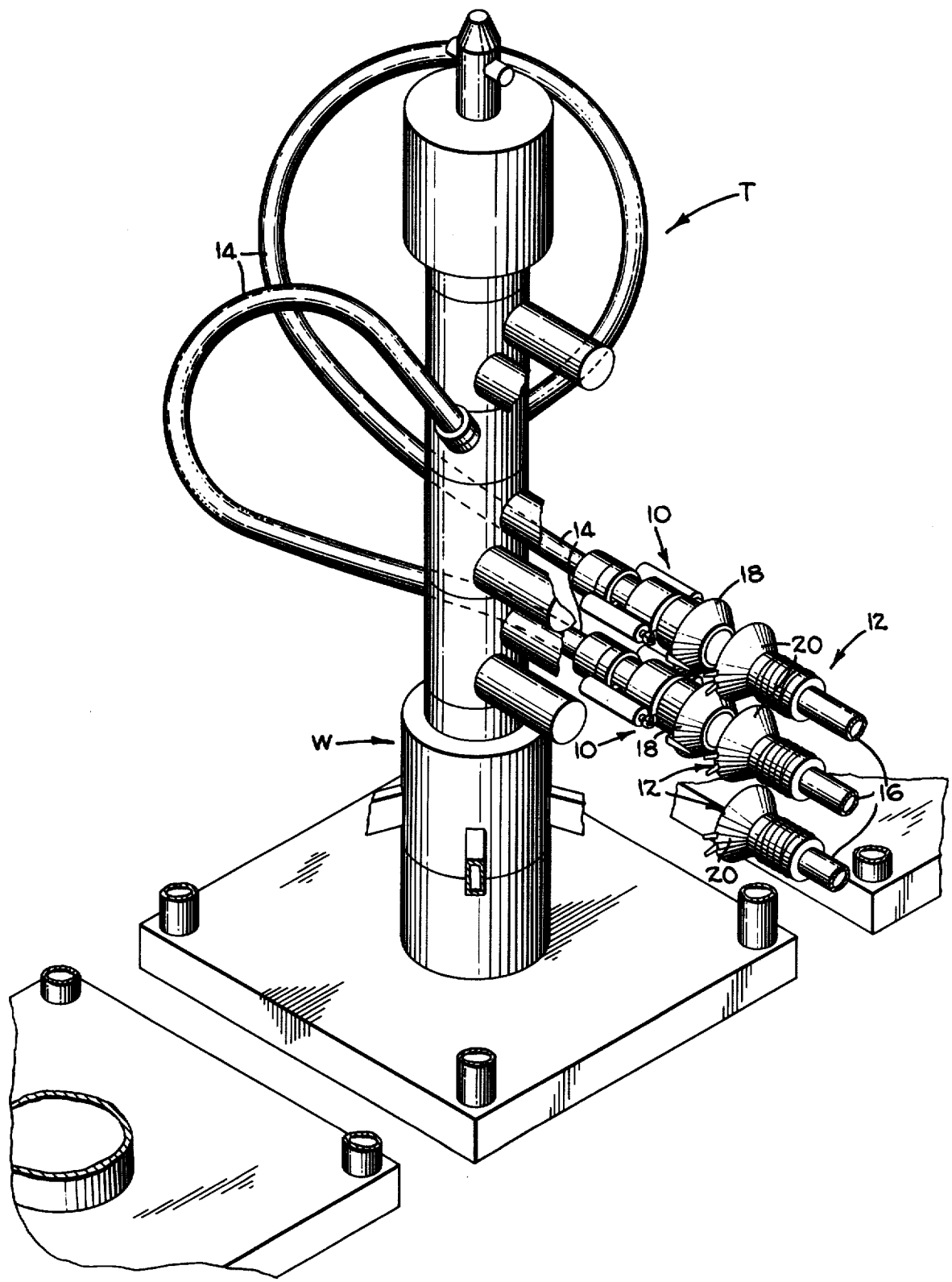
FIG_1

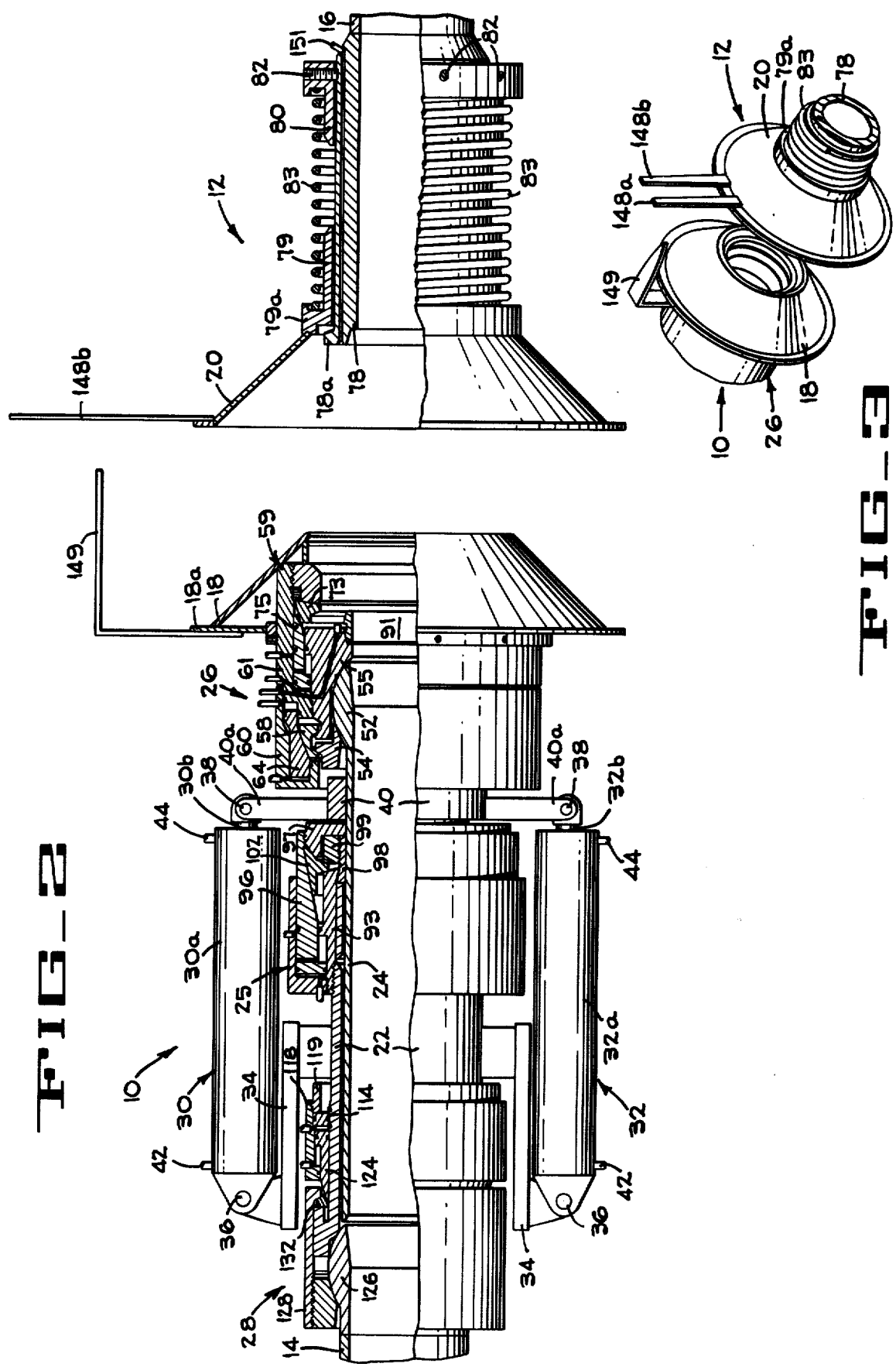

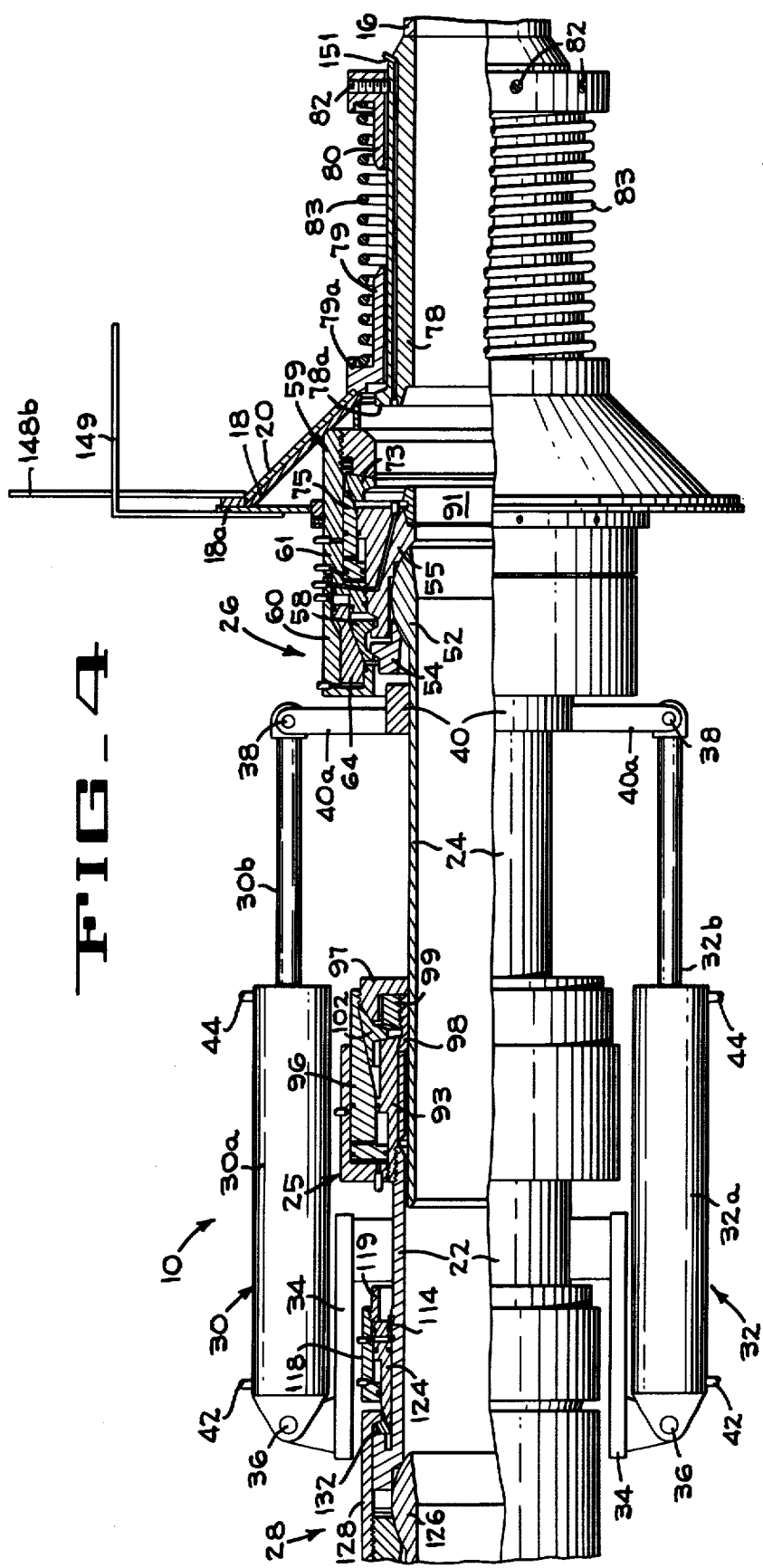

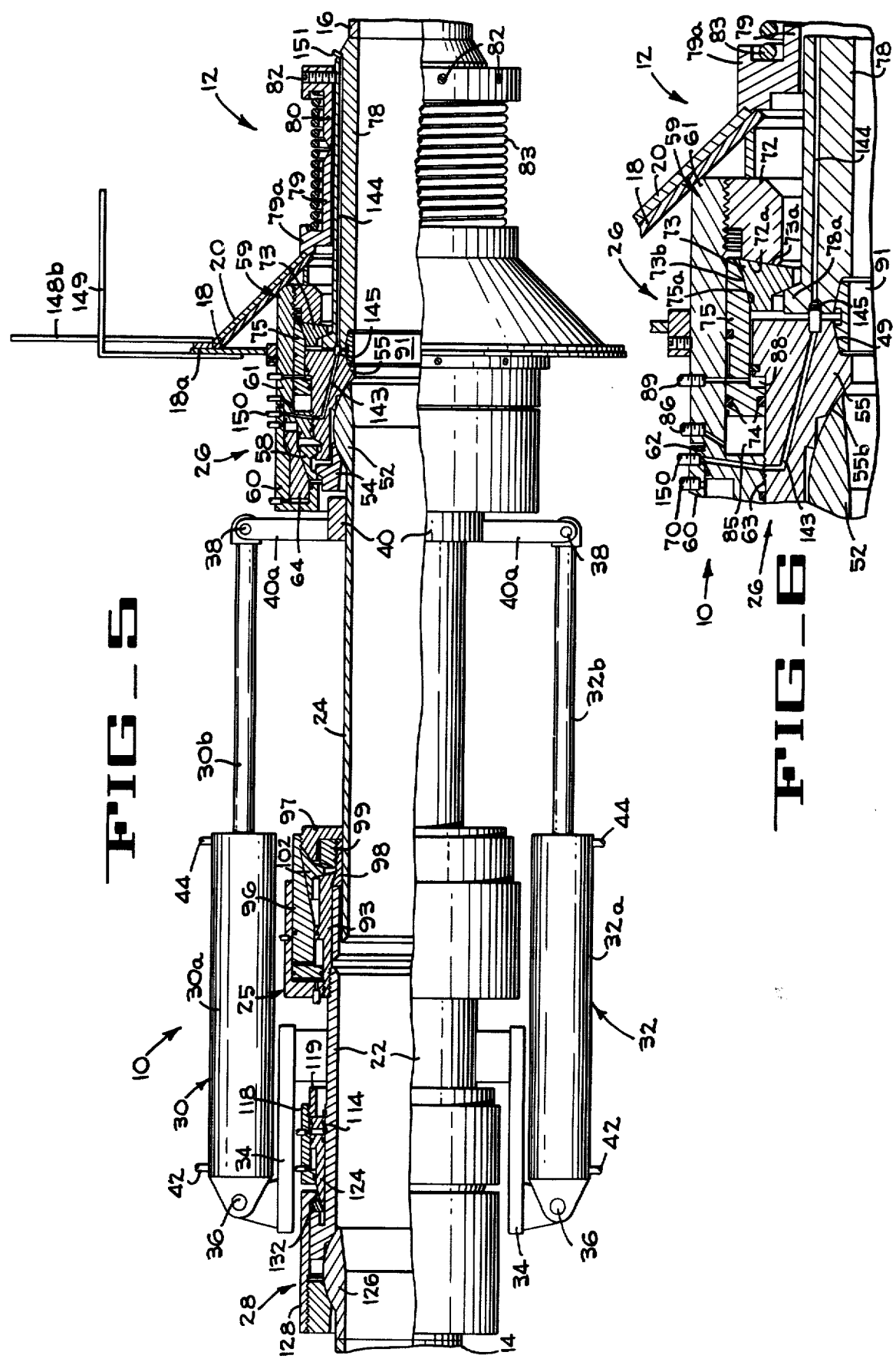

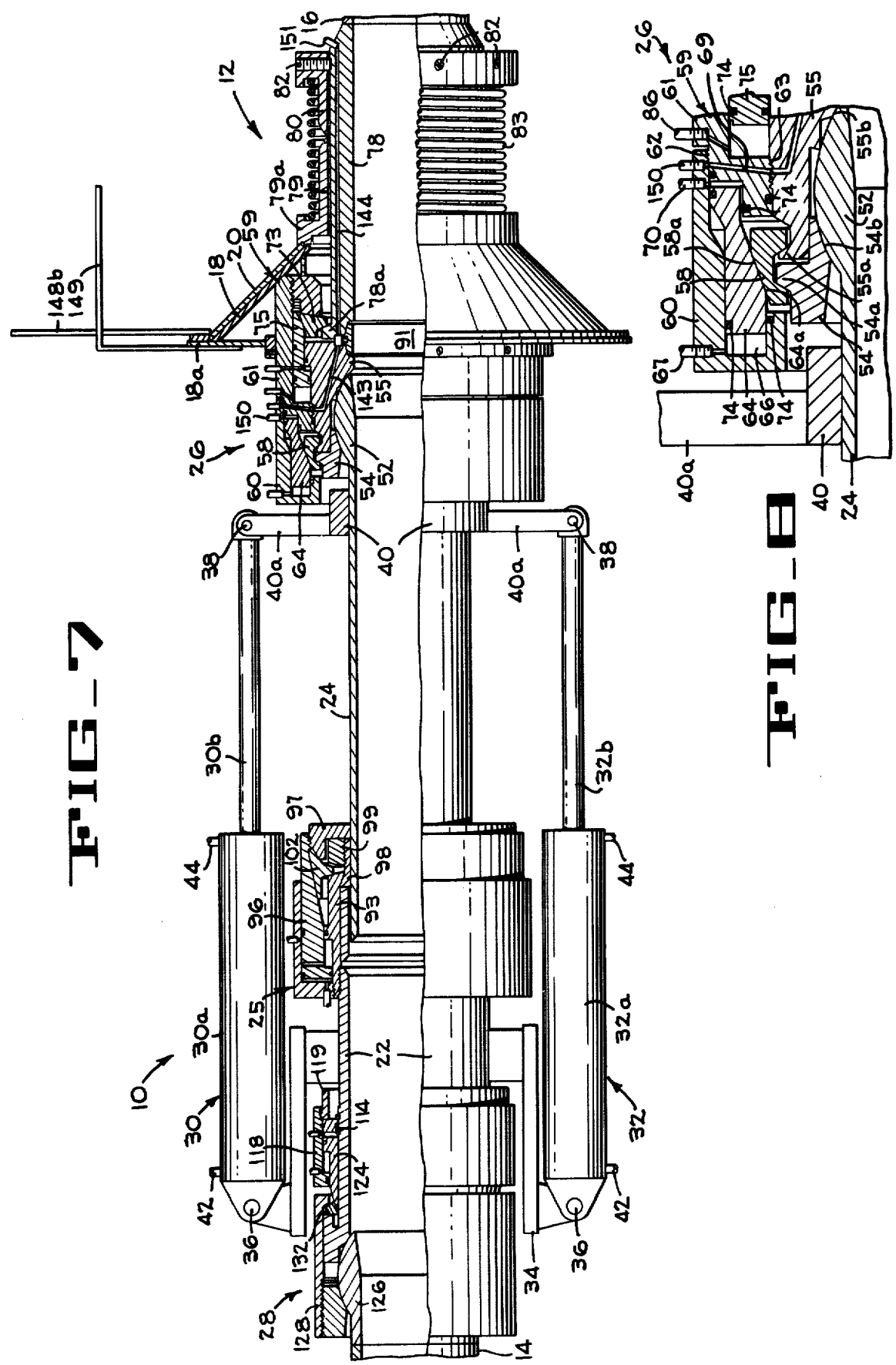

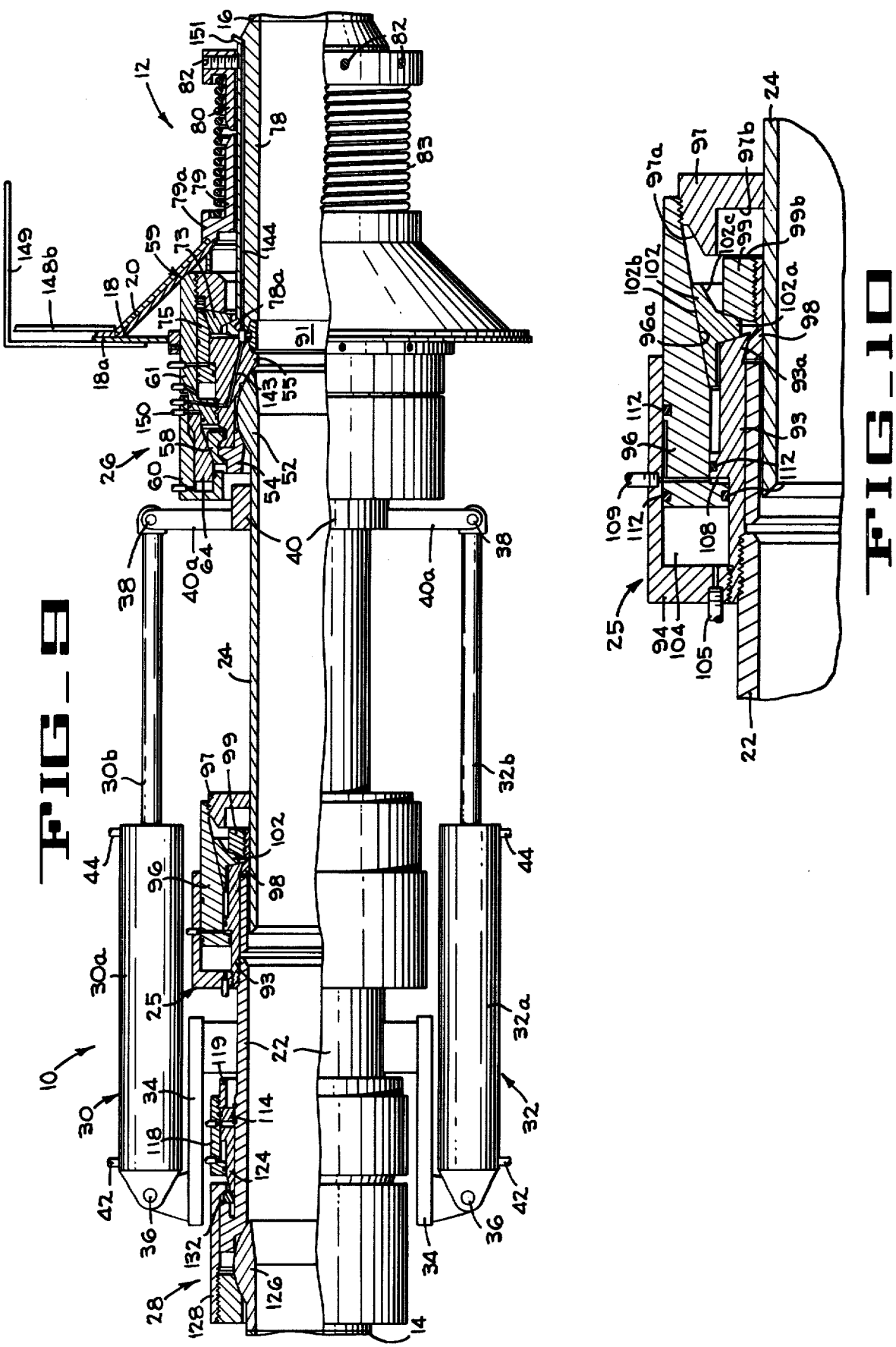

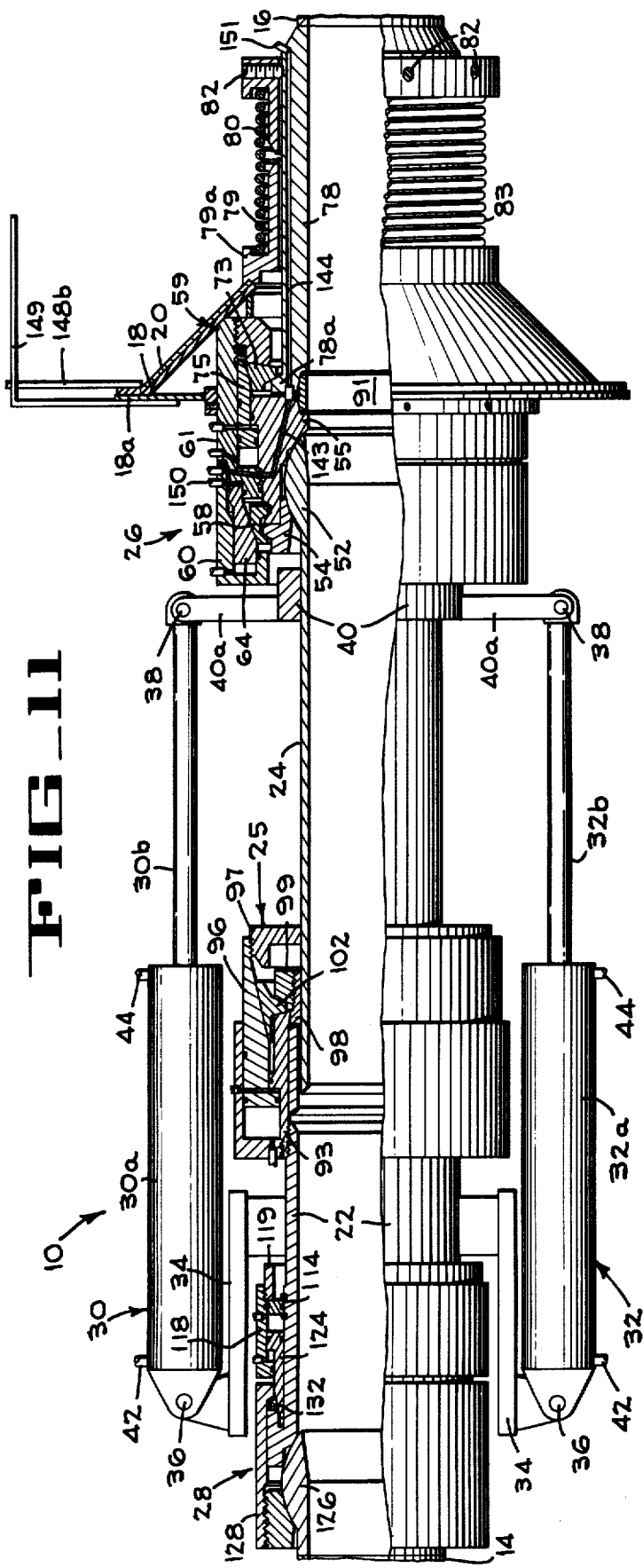

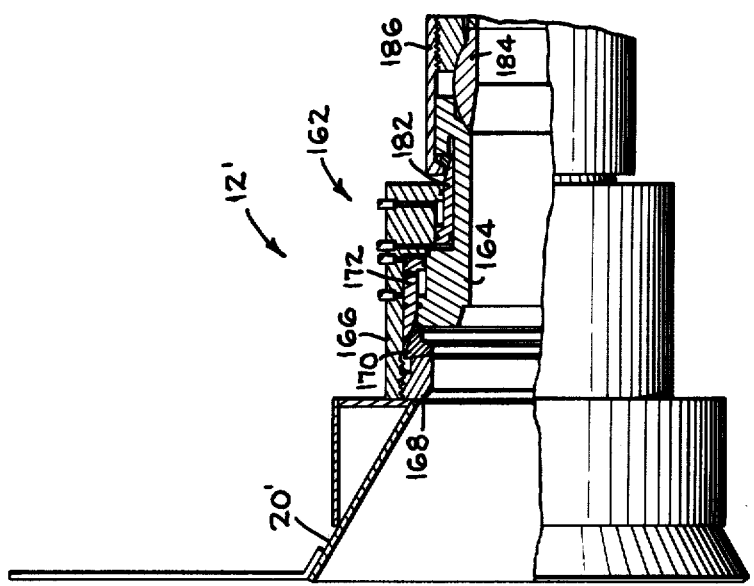

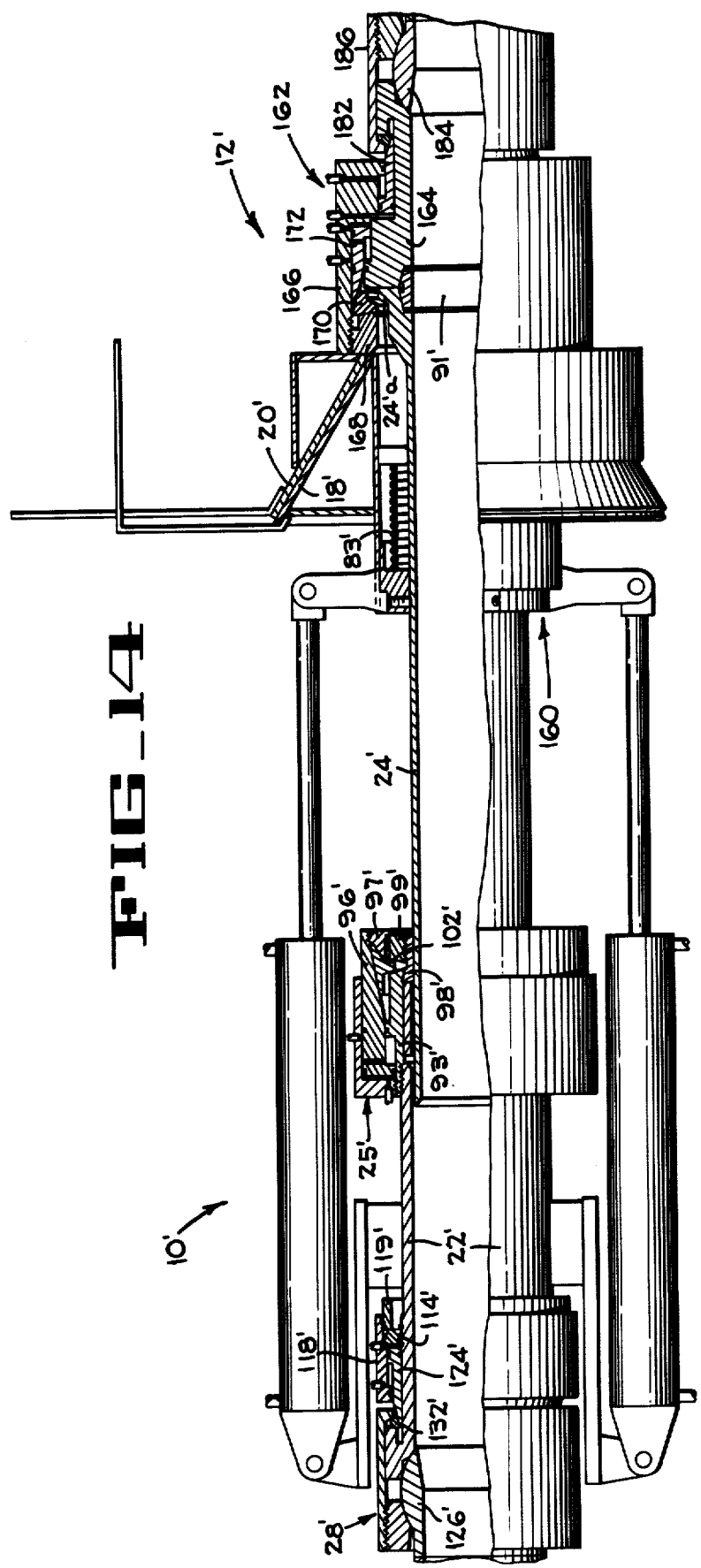

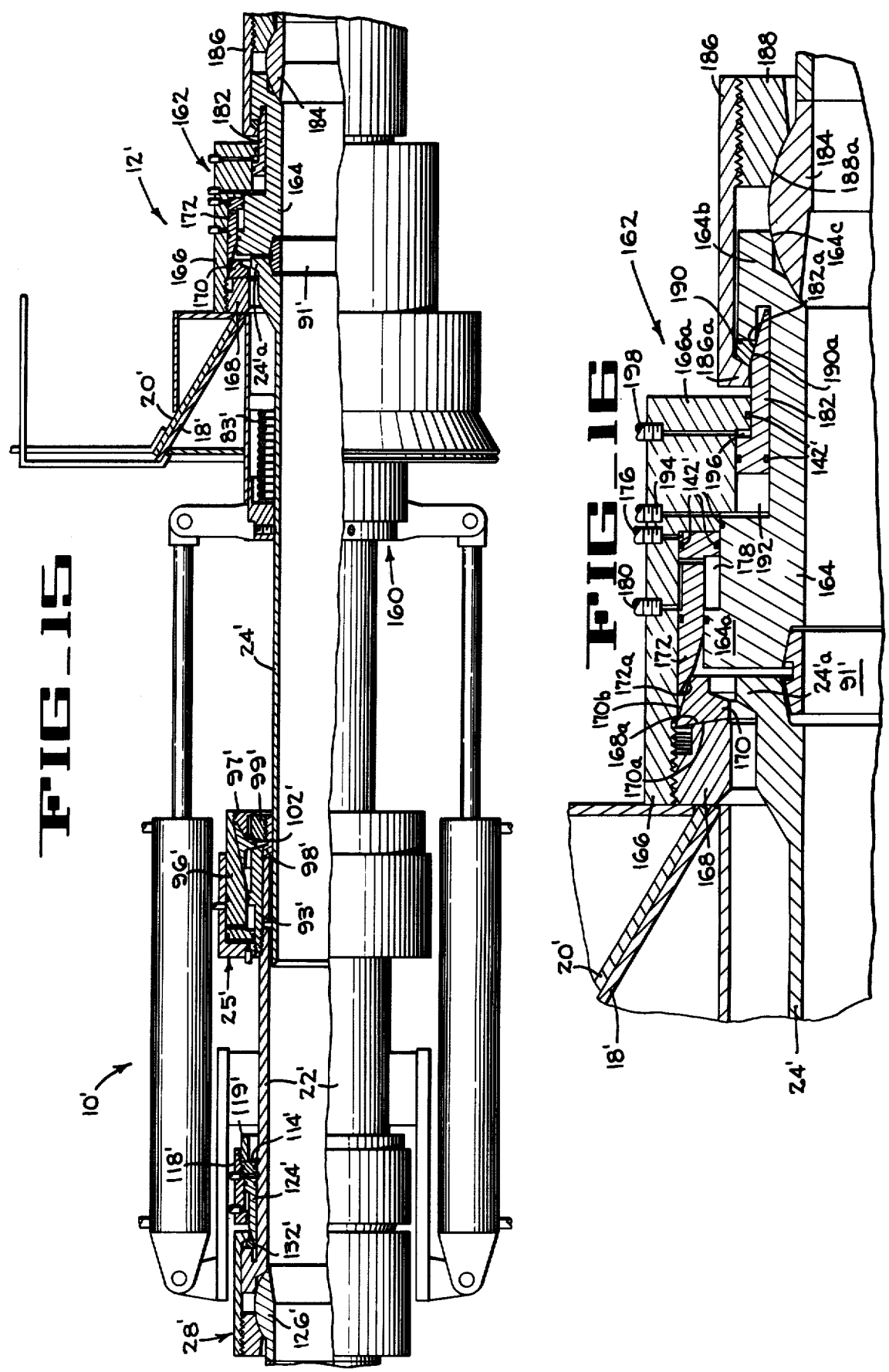

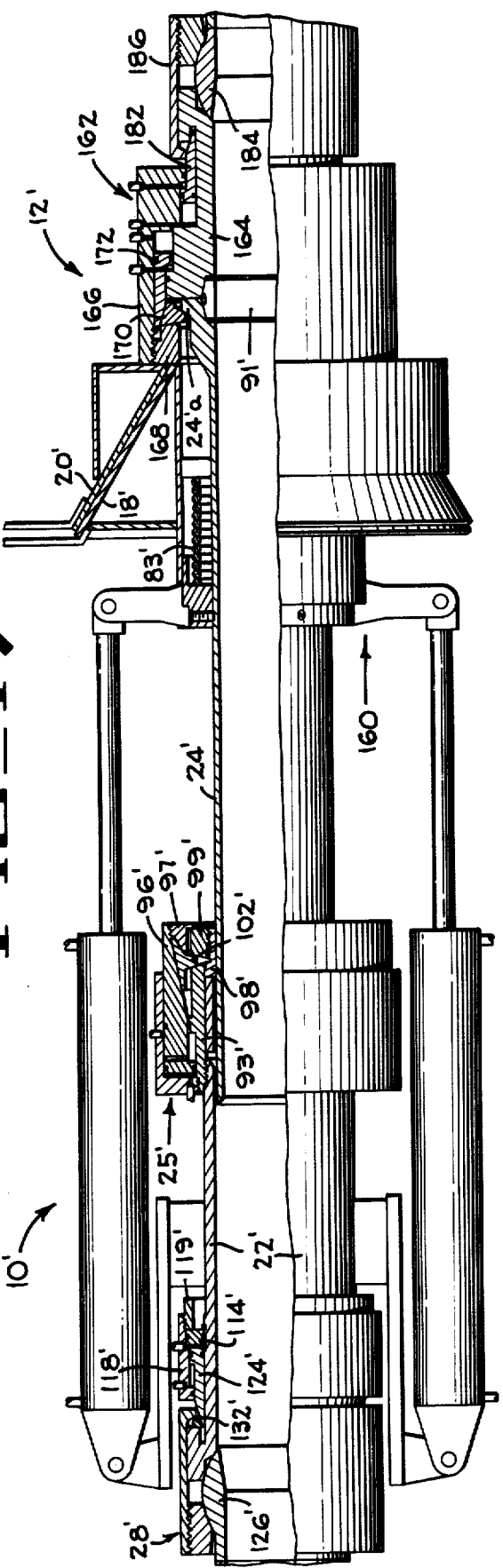
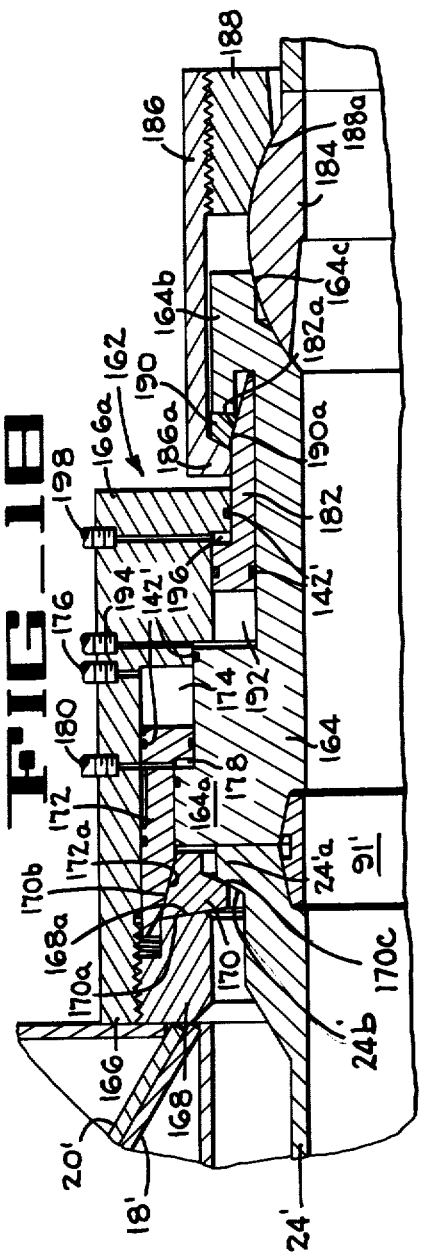

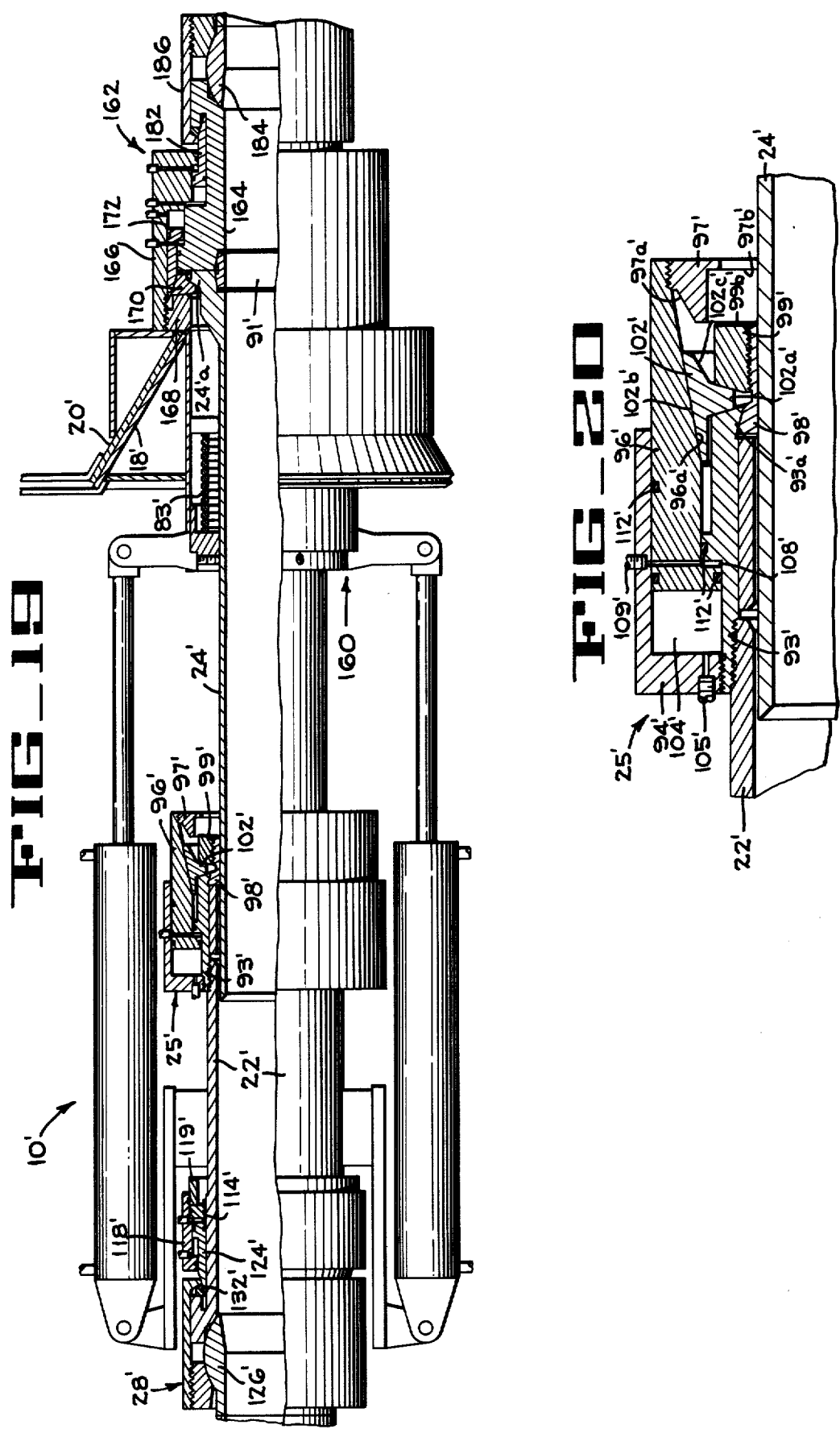

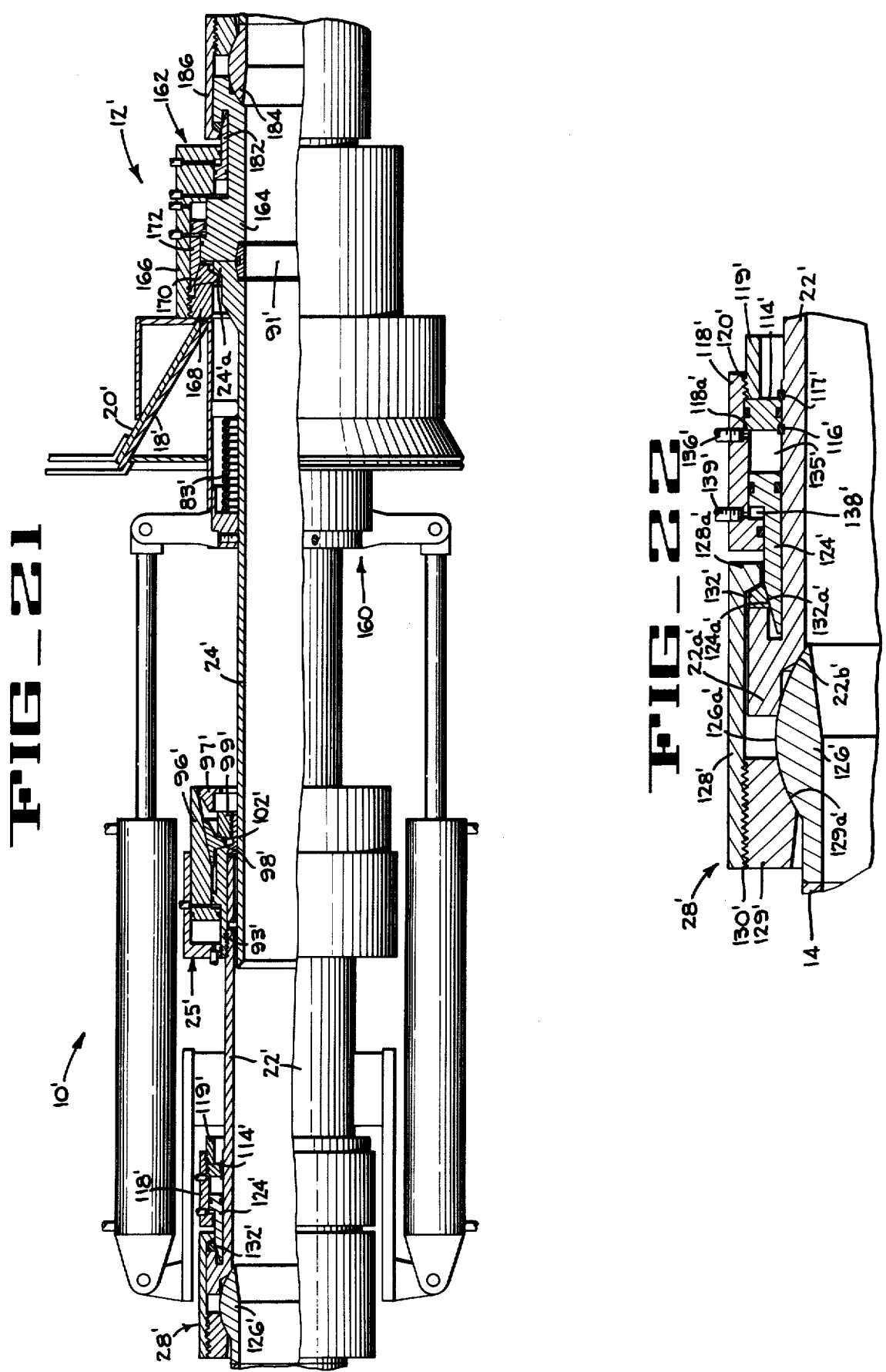

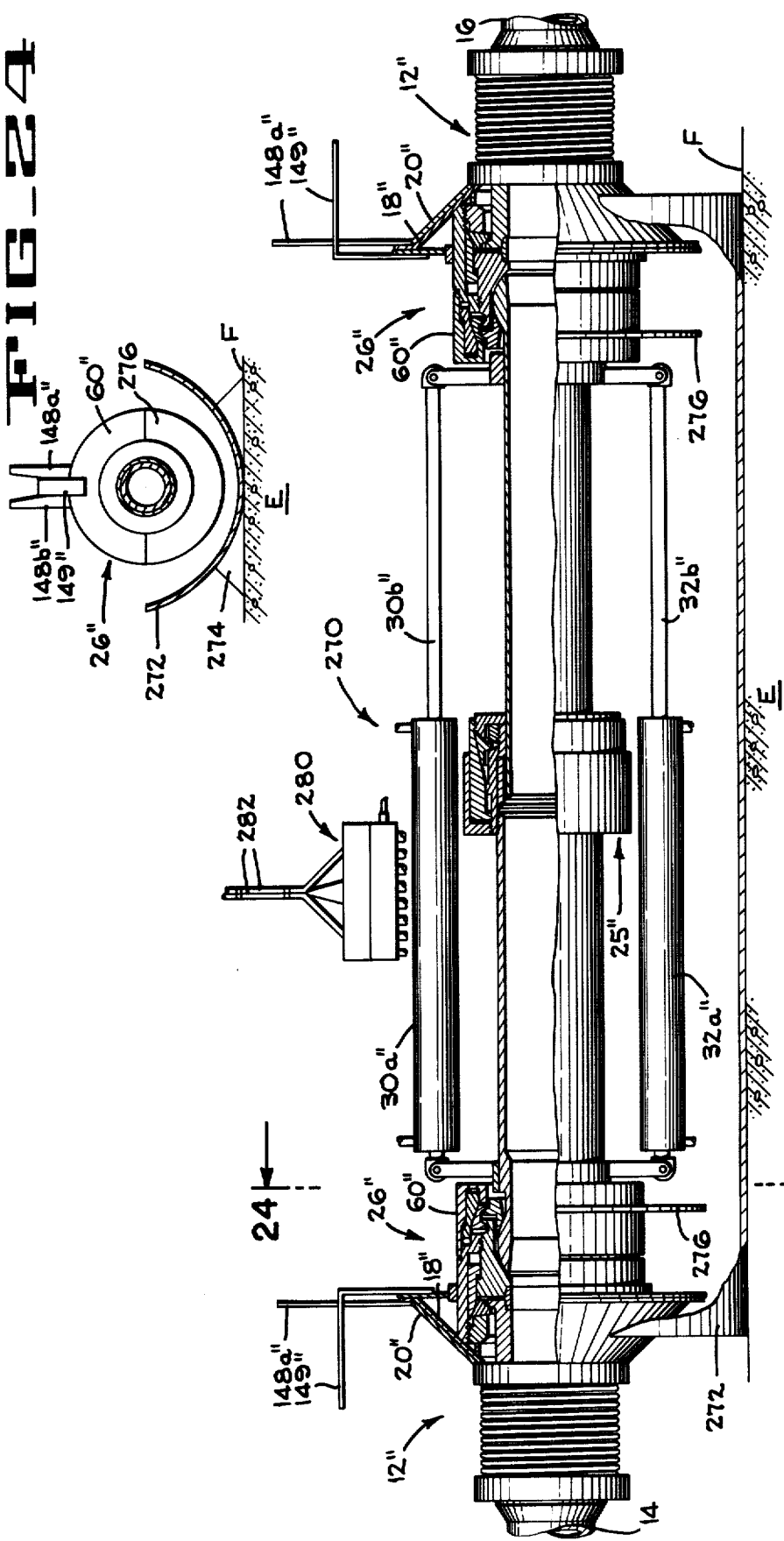

FIG_25
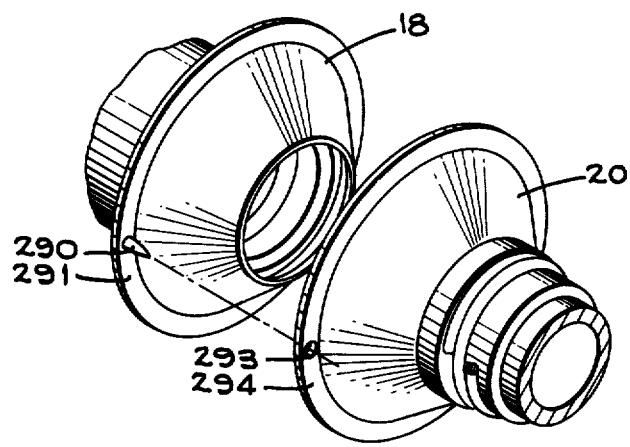
FIG_26
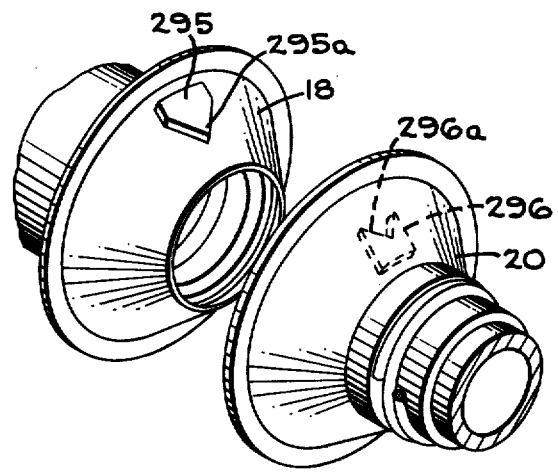

REMOTE-CONTROLLED FLOWLINE CONNECTOR

BACKGROUND OF THE INVENTION

1. Field of the Invention

The present invention relates to pipe connectors, and more particularly to underwater well flowline connectors that may be actuated by remote control.

2. Description of the Prior Art

In many adverse environments and/or locations where adjacent ends of two pipes must be connected together, such as flowlines at subsea oil or gas wellheads, it is very difficult to adequately align the ends of the pipes so that a fluid-tight connection thereof can be achieved. Various types of apparatus and techniques have been employed or suggested for interconnecting the ends of subsea well flowlines, including equipment requiring the assistance of one or more divers, and systems involving apparatus that is operated by remote control through the use of television or sonar signals. The expense and the inherent dangers to life that are associated with diver-assisted techniques establishes them as less than totally satisfactory, and the depth at which a diver can work efficiently is presently limited to relatively shallow waters. Although some of the remotely-operated connection systems are, at least theoretically, operable at any depth, substantial difficulties have been experienced in maintaining close control, and hence proper functioning, of these mechanisms.

In an attempt to overcome the foregoing problems, the ends of the flowlines have been connected to separate fabricated structures, but not infrequently there is insufficient space in these structures to allow sufficient flexure of the flowlines to accommodate any misalignment thereof. Also, the flowline may be so stiff that they cannot be bent to force their ends into proper alignment. Forced alignment of the end of the flowline often causes undue stress on precision seals at the connections, and may cause such seals to fail. Hence, it is desirable to have a coupling between the two flowlines that can accommodate a certain amount of misalignment when they are connected. Some examples of flowline connectors of this type are disclosed in the U.S. Pat. No. 3,554,579 to Brown, No. 3,732,923 to Fowler, and No. 3,874,706 to Arnold.

SUMMARY OF THE INVENTION

The present invention comprises a remotely controllable flowline pipe connector having a pair of coupling members each of which is designed for mounting on the end of one of a pair of pipes which are to be connected together. Two mating cones, one on the end of each of the coupling members, urge the coupling members into axial alignment as they engage each other. Fluid cylinders are included for moving the cone on the end of the first coupling member in a generally axial direction toward the cone on the end of the second coupling member. The flowline connector also includes a pair of ball joints that facilitate radial movement of the first and second coupling members as the cones urge these members into axial alignment. An annular seal is interposed between the two mating ends of the coupling members for providing a fluid tight seal therebetween, and means are provided for clamping the open end of the first coupling member into positive fluid-tight contact with the open end of the second coupling member.

BRIEF DESCRIPTION OF THE DRAWINGS

FIG. 1 is a diagrammatic isometric view of a subsea well with flowline connectors of the present invention interconnecting a plurality of flowlines with corresponding flowline loops at the wellhead.

FIG. 2 is a side elevation, partially in section, of one embodiment of flowline connector according to the present invention, showing the connectors male coupling member 10 in its fully retracted position.

FIG. 3 is an isometric view of the mating alignment cones of the connector of FIG. 2, showing guide means on the cones for assuring rotational alignment of the two coupling members.

FIGS. 4, 5, 7, 9 and 11 are side elevations, partially in section, of the connector of FIG. 2, showing in sequence the several stages of the connector during its operation.

FIGS. 6, 8, 10 and 12 are enlarged fragmentary sections of the connector as shown in FIGS. 5, 7, 9 and 11 respectively.

FIG. 13 is a side elevation, partially in section, of a second embodiment of flowline connector according to the present invention.

FIGS. 14, 15, 17, 19 and 21 are side elevations, partially in section, of the connector of FIG. 13, showing in sequence the several stages of the connector during its operation.

FIGS. 16, 18, 20 and 22 are enlarged fragmentary sections of the connector as shown in FIGS. 15, 17, 19 and 21, respectively.

FIG. 23 is a side elevation, partially in section, of a third embodiment of flowline connector according to the present invention.

FIG. 24 is a view taken along the line 24—24 of FIG. 23.

FIGS. 25 and 26 are isometrics of the mating alignment cones of the connector, illustrating an alternate means for assuring rotational alignment of the coupling members.

DESCRIPTION OF THE PREFERRED EMBODIMENTS

Embodiments of FIGS. 1-12

This embodiment of a remotely controllable flow-line connector in accordance with the present invention, shown diagrammatically in FIG. 1 as a component of the completion assembly on a subsea well W, comprises a male coupling member 10 and a female coupling member 12. The rear end of the male coupling member 10 is welded or otherwise secured to the end of a flowline loop 14 that extends from the well Christmas tree T, and the rear end of the female coupling member 12 is likewise secured to the end of a flowline 16 that is to be connected to the flowline loop 14 to provide a conduit between the well and a storage or other facility for the transfer of liquid or gas therebetween. The front-end of the male coupling member 10 includes a truncated cone-shaped element 18 that is supported thereon by an annular bracket 18a and that can be axially extended and retracted with respect to the flowline loop 14, and on the front end of the female coupling member 12 is a complementary truncated cone-shaped element 20. These cones 18, 20 function to bring the front end of the male coupling member 10 into axial alignment with the female coupling member 12 during the coupling operation, and thus assure that a fluid-tight seal between the members 10 and 12 will later be established. As the cone 18 contacts and moves into the cone 20 (FIG. 4) any lateral misalignment between the coupling members is compensated by pivotal movement of the cone 18 and the front portion of the male coupling member 10 until the cone 18 is aligned with and fully seated in the cone 20.

As illustrated in FIGS. 2, 4, 5, 7, 9 and 11, the male coupling member 10 further cmprises a tubular body 22, a sleeve 24 telescopically positioned inside of and concentric with the body 22, a pipe ball joint assembly 26 mounted on the front end of the sleeve 24 and carrying the cone 18, another pipe ball joint assembly 28 mounted on the rear end of the body 22, and a pair of hydraulic or other fluid powered double-acting piston-cylinder units 30,32. The cylinders 30a, 32a of the units 30,32 are mounted on the body 22 by means of brackets 34 and pins 36, the brackets 34 being welded or otherwise fixed to the body 22 so that the cylinders cannot move longitudinally with respect to the body. The piston rods 30b, 32b of the units 30,32 are connected by pins 38 to arms 40a of an annular support 40 that is welded or otherwise fixed to the sleeve 24.

When a source of fluid under pressure (not shown) is admitted to the cylinders 30a, 32a through conduits 42 and fluid is permitted to discharge through conduits 44, the piston rods 30b, 32b are extended from their cylinders, thereby causing the telescoping sleeve 24, the ball joint assembly 26, and the cone 18 to move to the right (as viewed in FIG. 2) towards their extended positions. Conversely, by connecting the hydraulic fluid under pressure to the conduits 44 and allowing fluid to exhaust from the conduit 42, the piston rods 30b and 32b are retracted into their cylinders, thereby causing the telescoping sleeve 24, the ball joint assembly 26, and the cone 18 to be moved to the left (as viewed in FIG. 2) towards their retracted positions.

The ball joint assembly 26 includes a ball element 52 mounted at one end of the telescoping sleeve 24. Surrounding the ball element 52 are annular rings 54 and 55 each having a flange adjacent one end thereof. The annular rings 54 and 55 are held in close proximity to each other by a plurality of generally U-shaped annular segments 58 (only one shown) as best seen in FIG. 8. A housing 59, comprising a pair of sleeves 60 and 61 threaded together at 62 (FIG. 8), is threaded at 63 to the annular ring 55.

The segments 58 are actuated to draw the flanges 54a and 55a together by an annular piston 64 which is slidably mounted within the sleeve 60. The piston 64 has an inner annular cam surface 64a that cooperates with an outer cam surface 58a on each of the segments 58. As hydraulic fluid under pressure is admitted into an annular chamber 66 through a port 67 in the sleeve 60, the piston 64 moves to the right (FIG. 8) toward the sleeve 61, causing the cam surface 64a to bear against and move along the upper cam surface 58a, thereby forcing segment 58 radially inward and drawing annular rings 54 and 55 toward each other. As rings 54 and 55 move toward each other, the surfaces 54b and 55b of these rings press against the outer surface of the ball portion 52 of the ball joint assembly 26, thereby locking the ball element to the housing 59 and establishing a fluid-tight metal-to-metal seal between the housing and the sleeve 24. A plurality of flexible seals 74 provide fluid-tight seals between the various metal parts inside the housing 59.

To unlock the ball element 52 from the housing 59, hydraulic fluid under pressure is admitted into a chamber 69 through a port 70, moving the piston 64 (FIG. 8) toward the left and causing the cam surface 64a of the piston to slide to the left over the cam surface 58a, thereby releasing the pressure on the segments 58 and allowing them to move in a radially outward direction. The radially outward movement of the segments 58 releases the pressure on the rings 54 and 55 so that rings 54 and 55 no longer press against the ball portion 52, thereby unlocking the ball element from the housing 59 and allowing the ball joint assembly 26 to flex.

The front end of the ball joint assembly 26 includes an inner annular metal ring 72 (FIGS. 2-6) which is threaded to the front end of the annular sleeve 61.

As seen best in FIG. 6, the left edge of the ring 72 includes a cam surface 72a which bears against a cam surface 73a of a split ring 73. The ring 73 is constructed so as to be biased in a radially outward direction, and bears against a cam surface 75a of an annular piston 75.

As hydraulic fluid under pressure is admitted into an annular chamber 85 through a port 86, the piston 75 moves to the right into the position shown in FIG. 6, causing the cam surface 75a to bear against and move along the cam surface 73b, thereby forcing the ring 73 radially inward to lock the male coupling member 10 and the female coupling member 12 in a secure connection. To unlock the coupling members 10 and 12, hydraulic fluid under pressure is applied to an annular chamber 88 through a port 89 to move the piston 75 to the left, whereby the split ring 73 expands radially outward to its position adjacent the annular section 61 as illustrated in FIGS. 2 and 4. The front end of the ball joint assembly 26 also includes an annular metal sealing ring 91 in an annular cavity 49 (FIG. 6) at the end of the annular ring 55, to provide a fluid-tight metal-to-metal seal between the front end of the male coupling member 10 and the front end of the female coupling member 12.

As illustrated in FIGS. 2, 4, 5, 7, 9 and 11, the female coupling member 12 comprises a tubular body 78 having a radially extending flange 78a on the left end thereof. An annular sleeve 79 having a radial extending flange 79a is slidably mounted on one end of the body 78, and an annular sleeve 80 is connected to the other end of the body 78 by a plurality of set screws 82. Mounted around the outside of the body 78 is a helical spring 83 which biases the sleeve 79 toward the left end of the body 78 (as viewed in FIG. 2). The female orienting cone 19 is welded or otherwise connected to the free end of the flange 79a.

The male coupling member 10 further includes a lock and seal assembly 25 to lock and seal the telescoping sleeve 24 to the body 22 in a metal-to-metal, fluid-tight manner. This lock and seal assembly 25 includes an annular sleeve 93 (FIGS. 9 and 10) which is threaded to the right end of the body 22, and another annular sleeve 94 threaded onto the left end of the sleeve 93. Slidably mounted between the sleeves 93 and 94 is an annular piston 96. The right end of the piston 96 is threaded onto a short annular piston 97 so that the pistons 96 and 97 move as a single unit. An annular ring 98 is slidably mounted around the telescoping sleeve 24, and another annular ring 99 is threaded onto the outside of the right end of the ring 98. A plurality of annular segments 102 (only one of which is shown in FIGS. 9 and 10), each having a generally wedge-shaped portion 102a, are mounted between the annular piston 96, The annular sleeve 93, and the ring 99.

As hydraulic fluid under pressure is admitted into a chamber 104 through a port 105, the piston 96 moves toward the right (FIGS. 9 and 10) causing the cam surface 96a of piston 96 to slide over a cam surface 102b of the segment 102, thereby forcing the wedge-shaped portion 102a of segment 102 radially inward between the adjacent ends of the sleeve 93 and the ring 99. The radially inward movement of the segment 102 causes rings 98 and 99 to be moved to the right as best shown in FIG. 10. As the ring 98 moves to the right the wedge-shaped end portion 93a of the ring 93 forces ring 98 in a radially inward direction against the sleeve 24, thereby providing a fluid-tight metal-to-metal seal between the annular sleeve 24 and the body 22 of the male coupling member, and preventing movement of the sleeve 24 relative to the body 22.

To unlock the sleeve 24 from the body 22, hydraulic fluid under pressure is admitted into a chamber 108 through a port 109, moving the piston 96 toward the left and causing the cam surface 96a of the piston to slide to the left over the cam surface 102b (FIG. 10), thereby releasing the pressure on the segments 102 and allowing them to move in a radially outward direction. As the piston 96 and the annular ring 97 move further toward the left (FIG. 10), the surface 97a engages the surface 102c and forces the segments 102 in a radially outward direction, thereby releasing the pressure on the rings 98 and 99. As the ring 97 moves still further toward the left the surface 97b presses against the surface 99b, thereby forcing the annular rings 99 and 98 to the left to provide a positive release of the radially inward pressure by the wedge-shaped right end of the ring 93 on the ring 98. This ensures that the ring 98 will no longer press against the sleeve 24 so that the sleeve 24 may be moved relative to the body 22. Fluid-tight seals between the annular piston 96, the sleeve 93, and the sleeve 94 are provided by a plurality of annular seal elements 112.

The ball joint assembly 28 includes a ball element 126 mounted on the end of the flowline loop 14 (FIGS. 11,12). Surrounding the ball element are an annular ring 129, an annular sleeve 128, and a flange 22a of the body 22. At its right end the sleeve 128 includes a radially inward extending flange 128a while the left end of the sleeve 128 is threaded to the outside of the ring 129 at 130. A generally wedge-shaped split ring 132 is positioned between the flange 22a and the flange 128a, with a lower cam surface 132a of the ring 132 resting upon an upper cam surface 124a of an annular piston 124. An annular ring 114 (FIG. 12) is secured to the body 22 by a pair of snap rings 116 and 117 which fit into grooves in the body 22. Surrounding the ring 114 are a pair of annular sleeves 118 and 119 which are threaded together at 120, with the ring 114 being positioned between the left edge of the ring 119 and a shoulder 118a of the ring 118. The annular piston 124 is slidably and concentrically mounted between the body 22 and the sleeve 118. The travel of the piston is limited by the snap ring 116 on the right of the piston and by the flange 22a on the body 22.

As hydraulic fluid under pressure is admitted to an annular chamber 135 through a port 136 the piston 124 moves to the left (FIG. 12), causing the surface 124a to slide over the surface 132a of the ring and thereby forcing the split ring 132 to move in a radially outward direction between the flanges 22a and 128a. The outward movement of the ring 132 forces the sleeve 128 and the ring 129 to move toward the right, thereby pressing the surfaces 22b and 129a against the surface 126a of the ball 126 thus locking the body 22 to the ball section 28. This not only prevents a bending movement of the left end portion of the male coupling member 10 when the parts are locked together, but also provides a fluid-tight metal-to-metal seal. A plurality of flexible seals 142 provide fluid-tight seals between the various metal parts.

To unlock the ball section 28 from the body 22, hydraulic fluid under pressure is admitted into a chamber 138 through a port 139, moving the piston 124 (FIG. 12) to the right and causing the cam surface 124a of the piston to slide to the right over the surface 132a of the ring thereby allowing the split ring 132 to move in a radially inward direction. The radially inward movement of the ring 132 releases the pressure on the sleeve 128 and the ring 129 so that the surfaces 22b and 129a are no longer pressed against the surface 126a of the ball 126 thus unlocking the body 22 from the ball section 28.

As seen best in FIG. 6, the front or right end of the male coupling member 10 includes a plurality of hydraulic passageways 143 (only one being shown) each of which must be accurately aligned with a corresponding hydraulic passageway 144 (only one shown) in the female coupling member 12. These passageways 143,144, when properly interconnected by means of sleeve-like connectors 145 (only one shown), allow hydraulic signals to be transmitted between a port 151 on member 12 and a port 150 on member 10. A guide system comprising a pair of orienting guides 148a and 148b (FIG. 3) welded or otherwise fixed to the outer edge of the cone 19, and a probe 149 mounted on the cone 18, functions to provide rotational alignment of the passageways 143,144 as the cone 18 moves into engagement with the cone 19. When more than one flowline (FIG. 1) is to be connected to the tree T, hydraulic pasageways 143,144 may be needed in only one of the flowline connectors in order to supply the tree with its hydraulic control requirements. Consequently, the orienting guides 148a,148b and 149 may not be necessary on all the connectors.

Operation of the Flowline Connector

The various operational steps for connecting two flowlines together with a flowline connector according to the present invention are shown sequentially in FIGS. 2–12. The male coupling member 10 and the female coupling member 12 are landed adjacent each other on the seafloor with a small space therebetween, and with the axis of member 10 as nearly aligned with the axis of member 12 as possible. Conventional means for landing and checking the alignment of a pair of flowlines can be used to obtain this approximate alignment of these two coupling members. The present invention is then used to provide the exact alignment required for remote-controlled fluid-tight coupling of the flowlines, and of course, the hydraulic passageways which are needed for signal control. At this time the hydraulic cylinders 30a and 32a are in their retracted position shown in FIG. 2, and the male cone 18 is spaced a short distance from the female cone 20. The ball joint assemblies 26 and 28 are in their unlocked condition so that they may be flexed. The sleeve 24 is unlocked from the body 22 so that the hydraulic cylinders 30a and 32a can provide axial movement of the coupling member 10 toward the female member 12.

The hydraulic cylinders 30a and 32a are then energized to move the telescoping sleeve 24 and the male orienting cone 18 from their retracted position shown in FIG. 2 toward their aligned position shown in FIG. 4. As the male cone 18 approaches the female cone 19, the pointed end of the probe 149 (FIG. 3) moves between the guides 148a and 148b thereby causing the cone 18 to move into rotational alignment with cone 20 so that the hydraulic passageways 143 in the male member 10 align with their corresponding passageways 144 in the female member 12.

As the male cone 18 is moved still further to the right (FIG. 5) it forces the female cone 20 and the annular sleeve 79 axially to the right, thereby compressing the helical spring 83 and forcing the male cone 18 and the right end portion of the male coupling member 10 to align along the axis of the female coupling member 12. When the male coupling member 10 is aligned both rotationally and axially with the female coupling member 10, the hydraulic passageways 143,144 are also aligned, and further axial movement to the right places the passageway connectors 145 in their final positions interconnecting the opposed ends of these passageways, thereby establishing a fluid-tight pressure conduit between the ports 150,151. At this time, the ball joint assemblies 26,28 are still unlocked to permit flexing of the joints so that the cones 18 and 20 fit together without undue strain on any seals or other components in the coupling members. The slip ring 73 rests against the sleeve 61 so that the coupling members 10 and 12 are still unlocked. member 10 is adjacent the flange 78a of the female coupling member 12 (FIGS. 5 and 6), the male coupling member 10 is then locked to the female coupling member 12 in a fluid-tight manner (FIGS. 5 and 6) by admitting hydraulic fluid under pressure to the annular chamber 85 through the port 86. This moves the piston 75 to the right, causing the cam surface 75a to move over the cam surface 73a and force the ring 73 radially inward between the annular ring 72 and the flange 78a. The inward movement of the wedge-shaped portion of the ring 73 causes the flange 78a to move toward the annular ring 55 and squeeze the annular sealing ring 91 between the body 78 and the ring 55 into a fluid-tight metal-to-metal seal, as seen best in FIG. 6. The ball joints 26 and 28 may now be locked to prevent their movement and the telescoping section 25 may be locked to prevent a change in length of the coupling member 10. The order in which this is done is not critical and in fact may be accomplished simultaneously.

In order to lock the ball joint 26 (FIGS. 7 and 8), hydraulic fluid under pressure is admitted to the chamber 66 through a port 67 to move the piston 64 to the right, causing its lower cam surface 64a to slide over the upper cam surface 58a of the segments 58 and force these segments radially inward. The inward movement of the segments 58 forces the ring 54 to move to the right toward the ring 55, thereby pressing and locking the lower surfaces 54b and 55b against the outer surface of the ball portion 52. This prevents movement between the ring 55 and the ball portion 52, and also establishes a fluid-tight metal-to-metal seal between these two elements.

In order to lock the ball joint 28 (FIGS. 11 and 12) hydraulic fluid under pressure is admitted into the chamber 135 through the port 136, thereby moving the piston 124 to the left, causing the cam surface 124a to slide along the cam surface 132a, and forcing the ring 132 to expand radially. This expansion of the ring 132 forces flange 128a, and thus the sleeve 128 and the ring 129, to move to the right until the surfaces 129a and 22b are forced against the surface of the ball element 126, thereby locking the ball element 126 to the body 22 in a metal-to-metal, fluid-tight manner.

When the telescoping sleeve 24 is to be locked, and sealed to the body 22 (FIGS. 9 and 10), hydraulic fluid under pressure is admitted into the chamber 104 of the lock and seal assembly 25 through the port 105, causing the piston 96 to move to the right. During this movement the cam surface 96a moves over the cam surfaces 102b of the segments 102, thereby forcing the wedge-shaped portion 102a of the segments 102 radially inwardly between the sleeve 93 and the ring 99. This causes rings 99 and 98 to move in unison to the right (FIG. 10) and wedge the left end of the ring 98 between the right end portion 93a of the ring 93 and the sleeve 24, thereby locking and sealing the sleeve 24 to the sleeve 93, and thus to the body 22.

Embodiment of FIGS. 13-22

FIGS. 13-22 disclose another embodiment of the present invention wherein the male cone 18' is mounted on the sleeve 24' of the male coupling member 10' by means of a telescoping assembly 160, and the female cone 20' is attached to a ball joint assembly 162 of the female coupling member 12'. The assembly 160 includes an annular sleeve 161 which is slidably mounted to the sleeve 24' and a helical spring 83' which biases the sleeve 161 and the cone 18' toward the right end of the body 22 (as viewed in FIG. 13). The operation of many of the elements of this embodiment is similar to their counterparts in the hereinbefore described preferred embodiment of FIGS. 2-12, and in fact the ball joint assembly 28' and the lock and seal assembly 25' of the embodiment illustrated in FIGS. 13-22 are essentially identical with their counterparts 28,25 in the preferred embodiment of FIGS. 2-12. Therefore, similar parts have been given corresponding numbers with a prime to indicate the embodiment of FIGS. 13-22.

As can be seen in FIGS. 15-18, the ball joint assembly 162 on the female coupling member 12' is similar in several respects to both of the ball joint assemblies 26,28 of the preferred embodiment. However, for the sake of clarity and simplicity the elements of the assembly 162 have been assigned new numbers not heretofore used. Thus, the assembly 162 includes an annular body 164 having a flange 164a at its front end, and a flange 164b at its other end. Surrounding the body 164 is an annular sleeve 166 with a radially inward extending flange 166a on its rear end and threaded to the front end of the sleeve 166 is an inner annular metal ring 168. The right or rear edge of the ring 168 includes a cam surface 168a which bears against an opposing cam surface 170a of a split ring 170. The ring 170 is constructed so as to be biased in an expanded or radially outward direction, and thus at rest bears against the cam surface 172a of an annular piston 172. The piston 172 is slidably mounted concentrically inside the annular sleeve 166. As hydraulic fluid under pressure is admitted to a chamber 174 (FIG. 18) through a port 176, the piston 172 moves to the left so that its inclined surface 172a slides over the cam surface 170b of ring 170, thereby forcing ring 170 in a radially inward direction to the position shown in FIG. 18. The radial inward movement of ring 170 causes the cam surface 170c to bear against and move along a cam surface 24'b, thereby forcing the ring 73 radially inward to lock the male coupling member 10' and the female coupling member 12' in a secure connection with the flange 24'a against the flange 164a. The annular metal sealing ring 91' provides a fluid-tight metal-to-metal seal between the front end of the male coupling member 10' and the front end of the female coupling member 12'. When hydraulic fluid under pressure is admitted to a chamber 178, through a port 180, the piston moves to the right and the split ring 170 expands outward against the annular sleeve 166 into the position shown in FIG. 16.

The ball joint assembly 162 (FIGS. 15-18) further includes an annular piston 182 that is slidably mounted between the body 164 and the sleeve 166. The ball element 184 of the joint 162 is surrounded by the annular flange 164b, an annular sleeve 186, and an annular ring 188. The sleeve 186 and the ring 188 are threaded together so they move as a single unit. A generally wedge-shaped split ring 190 is positioned between the flange 164b of the body 164 and a radially inward extending flange 186a of the sleeve 186, with the cam surface 190a of the ring 190 bearing against an upper cam surface 182a of the piston 182. As hydraulic fluid is admitted to a chamber 192 through a port 194, the piston 182 moves to the right into the position shown in FIGS. 16 and 18, thereby forcing the split ring 190 in a radially outward direction between the flanges 164b and 186a. This outward movement of the ring 190 forces the sleeve 186 and the ring 188 to move toward the left, thereby causing the surfaces 164c and 188a to press against the outer surface of the ball element 184 thereby locking the body 164 to the ball element 184. This not only prevents movement of the ball joint assembly 162, but also provides a fluid-tight metal-to-metal seal between the ball element 184 and the body 164. As in the preferred embodiment, a plurality of flexible seal elements 142' provide fluid-tight seals between the various metal parts. As should be readily apparent, the ball joint assembly 162 is unlocked by admitting hydraulic pressure into the annular chamber 196 through port 198, and of course simultaneously venting the chamber 192 through port 194.

As shown best in FIGS. 21 and 22, the ball joint assembly 28' includes a ball element 126' mounted on the end of the flowline loop 14. Surrounding the ball element are an annular ring 129', an annular sleeve 128', and a flange 22a' of the body 22'. At its right end the sleeve 128' includes a radially inward extending flange 128a', while the left end of the sleeve 128' is threaded to the outside of the ring 129' at 130'. A generally wedge-shaped split ring 132' is positioned between the flange 22a' and the flange 128a', with a lower cam surface 132a' of the ring 132' resting upon an upper cam surface 124a' of an annular piston 124'. An annular ring 114' (FIG. 22) is secured to the body 22' by a pair of snap rings 116' and 117' which rest in grooves in the body 22'. Surrounding the ring 114' are a pair of annular sleeves 118' and 119' which are threaded together at 120', with the ring 114' being positioned between the left edge of the ring 119' and a shoulder 118a' of the ring 118'. The annular piston 124' is slidably mounted between the body 22' and the sleeve 118'. The travel of the piston is limited by the snap ring 116' on the right of the piston and by the flange 22a' of the body 22'.

As hydraulic fluid under pressure is admitted to an annular chamber 135' through a port 136' the piston 124' moves to the left (FIG. 22), causing the surface 124a' to slide over the surface 132a' of the ring and thereby forcing the split ring 132' to move in a radially outward direction between the flanges 22a' and 128a'. The outward movement of the ring 132' forces the sleeve 128' and the ring 129' to move to the right, thereby pressing the surface 22b' and 129a' against the surface 126a' of the ball element 126' and locking the body 22' to the ball joint assembly 28'. This prevents any bending movement of the left end portion of the male coupling member 10' when the parts are locked together, and also provides a fluid-tight metal-to-metal seal.

To unlock the ball section 28' from the body 22', hydraulic fluid under pressure is admitted into a chamber 138' through a port 139', moving the piston 124' (FIGS. 21, 22) to the right and causing the cam surface 124a' of the piston to slide to the right over the surface 132a' of the ring, thereby allowing the ring 132' to move in a radially inward direction. The radially inward movement of the ring 132' releases the pressure on the sleeve 128' and the ring 129' so that the surfaces 22b' and 129a' are no longer pressed against the surface 126a' of the ball 126' thus unlocking the body 22' from the ball section 28'.

The male coupling member 10' further includes a lock and seal assembly 25' to lock and seal the telescoping sleeve 24' to the body 22' in a metal-to-metal fluid-tight manner. The assembly 25' includes an annular sleeve 93' (FIGS. 19,20) which is threaded to the right end of the body 22', and another annular sleeve 94' threaded onto the left end of the sleeve 93'. Slidably mounted between the sleeves 93' and 94' is an annular piston 96'. The right end of the piston 96' is threaded onto a short annular piston 97' so that the pistons 96' and 97' move as a single unit. An annular ring 98' is slidably mounted around the telescoping sleeve 24', and another annular ring 99' is threaded onto the outside of the right end of the ring 98'. A plurality of annular segments 102' (only one of which is shown in FIGS. 19 and 20), each having a generally wedge-shaped portion 102a', are mounted between the annular piston 96', the annular sleeve 93', and the ring 99'.

As hydraulic fluid under pressure is admitted into a chamber 104' through a port 105', the piston 96' moves toward the right (FIGS. 19 and 20) causing the cam surface 96a' of the piston 96 to slide over a cam surface 102b' of the segment 102', therefore forcing the wedge-shaped portion 102a' of segment 102 radially inward between the adjacent ends of the sleeve 93' and the ring 99'. The radial inward movement of the segment 102' causes rings 98' and 99' to be moved to the right as best shown in FIG. 20. As the ring 98' moves to the right the wedge-shaped end portion 93a' of ring 93' forces ring 98' in a radially inward direction against the sleeve 24', thereby providing a fluid-tight metal-to-metal seal between the annular sleeve 24' and the body 22' of the male coupling member and preventing movement of the sleeve 24' relative to the body 22'.

To unlock the sleeve 24' from the body 22', hydraulic fluid under pressure is admitted into a chamber 108' through a port 109', moving the piston 96' toward the left and causing the cam surface 96a' of the piston to slide to the left over the cam surface 102b' (FIG. 20), thereby releasing the pressure on the segments 102' and allowing them to move in a radially outward direction. As the piston 96' and the annular ring 97' move further toward the left (FIG. 20), the surface 97a' engages the surface 102c' and forces the segments 102' in a radially outward direction, thereby releasing the pressure on the rings 98' and 99'. As the ring 97' moves further toward the left the surface 97b' presses against the surface 99b', thereby forcing the annular rings 99' and 98' to the left to provide a positive release of the radially inward pressure by the wedge-shaped right end of the ring 93' on the ring 98'. This ensures that the seal 98' will no longer press against the sleeve 24' so that the sleeve 24' may be moved relative to the body 22'. Fluid-tight seals between the annular piston 96', the sleeve 93', and the sleeve 94' are provided by a plurality of annular seal elements 112'.

Embodiment of FIGS. 23 and 24

FIGS. 23 and 24 disclose a third embodiment of the present invention wherein a male coupling member 270 includes a pair of truncated guide cones 18", with one of the cones being mounted on either end of the member 270. Adjacent either end of the male coupling member 270 is a female coupling member 12", each of which is identical to the member 12 disclosed in FIGS. 2-12. One female coupling member 12" is connected to a flowline 16, and the other female coupling member 12" is connected to a flowline loop 14. Extending between and slightly below the members 12" is a trough 272 which can be mounted at a suitable location, herein shown on the earth E by means of supports 274 (FIG. 24). The trough is formed of a portion of a cylinder having a diameter somewhat larger than the diameter of the open ends of the guide cones 18".

The male coupling member 270 includes a pair of ball joint assemblies 26" and a lock and seal assembly 25" that are identical to their counterparts in the preferred embodiment of FIGS. 2-12. A semi-circular support ring 276, fixed to the lower half of the sleeve 60, near each end of the male coupling member 270, supports the male member when it is landed in the trough 272. A harness 280, which includes a support cable and a plurality of hydraulic lines 282, is suitably connected (not shown) to the male member 270 so that the support cable can be used to lower the connector into the trough and the hydraulic lines can provide power to operate the various pistons and cams which connect and disconnect the various portions of the coupling member in the manner described hereinbefore. In FIG. 23 the male coupling member 270 is shown in its extended condition and connected to the two female coupling members 12". During the time it is being lowered into position in the trough, the male coupling member 270 is in its retracted condition with the piston rods 30b" and 32b" retracted into the cylinders 30a" and 32a", respectively.

When installing this embodiment of the invention, the trough 272 and one of the female coupling members 12" are placed in position on the seafloor F with this female coupling member near one end of the trough. The other female coupling member is then brought into position near the second end of the trough, and the male coupling member 270 is lowered until the semi-circular rings 276 come to rest on the inside of the trough. Hydraulic power is then applied to the hydraulic cylinders 30a" and 32a", causing the conical members 18" to move toward and into the respective conical members 20", ultimately lifting the male coupling member 270 out of the trough 272 and into the position shown in FIGS. 23 and 24. As this occurs, the guides 148a", 148b" and probes 149" provide proper rotational orientation of the male coupling member 270 relative to the female members 12", and the ball joint assemblies 26" provide proper axial alignment of the cones 18", 20" as described hereinbefore. Hydraulic pressure is then directed to the ball joint assemblies 26" and the lock and seal assembly 25" to actuate these assemblies and complete the connecting operation as described hereinbefore. The harness 280 may then be disconnected and retrieved from the coupling member 270 if desired.

FIGS. 25 and 26 disclose additional embodiments of a guide system for providing exact rotational alignment of the male and female conical members 18,20. The embodiment of FIG. 25 includes a pointed rod 290 which is mounted on the forward surface of a flange 291 of the male cone 18, and a bore 293 through a flange 294 of the female cone 20. As the male cone 18 is advanced toward the female cone 20, the pointed rod 290 moves into the bore 293 and brings the two cones into precise alignment. The embodiment of FIG. 26 includes a wedge-shaped male guide member 295 mounted on the male conical member 18, and a notched complementary female guide member 296 mounted on the conical member 20. When the cone 18 is advanced toward the cone 20 the pointed front 295a of the male guide member 295 moves into the complementary notch 296a of the female guide member 296, thus accomplishing the desired precise alignment of the two cones.

Accordingly, it can be seen that the present invention described herein provides a novel flowline connector having a pair of coupling members with means for providing both rotational and axial alignment of their mating ends. The connector also includes remotely controllable means for extending the coupling end or ends of one member into mating engagement with the other member, and then releasably coupling these members together. Furthermore, metal-to-metal seals between the mating ends and also at other critical areas of the apparatus provide fluid-tight integrity throughout the system, and these seals may all be set and released by remote control.

Although the best mode contemplated for carrying out the present invention has been herein shown and described, it will be apparent that modification and variation may be made without departing from what is regarded to be the subject matter of the invention.

What I claim is:

1. A remotely controllable connector for interconnecting the ends of a pair of subsea flowline pipes using remote control, said connector comprising:
    a pair of coupling members, at least one of said coupling members being extendable;
    means for connecting a first end of each of said coupling members to the end of a corresponding one of said pair of flowling pipes;
    a pair of orienting cones;
    means for connecting each of said cones to a second end of a corresponding one of said coupling members, said cones providing means for urging said coupling members into axial alignment as said coupling members are moved toward each other;
    power means for extending said extendable coupling member to move said second end of said extendable coupling member in a generally axial direction toward said second end of the other coupling member;
    universal joint means connected between said first end of a first coupling member and said first end of a second coupling member to provide axial alignment of said second end of said first coupling member with said second coupling member as said cones urge said coupling members toward axial alignment;
    means for clamping said second end of said first coupling member to said second end of said second coupling member; and an annular seal interposed between said second ends of said coupling members for providing a fluid-tight seal therebetween.

2. A connector as defined in claim 1 including means to transmit power to said power means when the coupling members are in a predetermined angular relationship, said connector having means for rotating said coupling members with respect to each other as said coupling members are moved toward each other to place the coupling members in said predetermined angular relationship.

3. A connector as defined in claim 1 wherein said annular seal is a metal-to-metal seal.

4. A connector as defined in claim 1 wherein said universal joint means includes a pair of ball joints with said ball joints being connected between said first end of said first coupling member and said second end of said first coupling member.

5. A connector as defined in claim 4 including remote control means for locking said ball joints to prevent flexing of said joints after said first and said second coupling members are aligned.

6. A connector as defined in claim 5 including remote control means for unlocking said ball joints to permit flexing of said joints.

7. A connector as defined in claim 1 including metal means for sealing said extendable coupling member against leakage and remote control means for setting and releasing said sealing means.

8. A connector as defined in claim 1 wherein said means for clamping includes remote control means for locking said second end of said first coupling member to said second end of said second coupling member and remote control means for unlocking said first coupling member from said second coupling member.

9. A remotely controllable connector for interconnecting the ends of a pair of pipes comprising:
a pair of coupling members each having hydraulic passageways therein;
means for connecting a first end of each of said coupling members to the end of a corresponding one of said pipes;
a pair of truncated cones;
means for connecting each of said cones to a second end of a corresponding one of said coupling members, said cones being mounted so that a first of said cones mates with a second of said cones to align said cones along a common axis as said cones are moved toward each other;
a pair of universal pipe joints for connection between said first end of a first of said coupling members and said first end of a second of said coupling members to provide axial alignment of said second end of said first coupling member with said second end of said second coupling member as said cones urge said coupling members toward axial alignment;
means for connecting a first of said pipe joints between the first and second ends of said first coupling member;
means for connecting a second of said pipe joints between the first and second ends of said second coupling member;
hydraulic power means connected to said passageways for moving said first cone in a generally axial direction toward said second cone;
orienting guides on respective connectors to rotate said connector to provide rotational alignment of the passageways as said coupling members are moved toward each other; and
means for clamping said second end of said first coupling member in a fluid-tight connection with said second end of said second coupling member.

10. A connector as defined in claim 9 wherein said means for moving said first cone includes remote control means for changing the length of said first coupling member.

11. A connector as defined in claim 9 wherein said means for clamping includes an annular metal seal connected between said second end of said first coupling member and said second end of said second coupling member.

12. A connector as defined in claim 10, including gripping means, means for mounting said gripping means on said second end of said first gripping member, a flange connected to said second end of said second coupling member, and remote control actuating means for moving said gripping means into firm contact with said flange.

13. A connector as defined in claim 1 including a pair of universal pipe joints;
means for connecting each of said universal pipe joints between said first and said second ends of said first coupling member to provide axial alignment of said second end of said first coupling member with said second end of said second coupling member as said cones urge said coupling members toward axial alignment.

14. A connector as defined in claim 9 including a spring member connected between said second cone and said second coupling member to permit yielding of said second cone after engagement by said first cone as said second end of said first coupling member is moved toward said second end of said second coupling member for connection thereto.

15. A connector as defined in claim 9 including means for telescopic connection of said second end of said first coupling member to said first end of said first coupling member.

16. A remotely controllable connector for interconnecting the ends of a pair of pipes comprising:
a pair of coupling members;
means for connecting a first end of each of said coupling members to the end of a corresponding one of said pipes;
a pair of truncated cones;
means for connecting each of said cones to a second end of a corresponding one of said coupling members, said cones providing means for urging said coupling members into axial alignment as said coupling members are moved toward each other;
means for moving said second end of a first coupling member in a generally axial direction toward said second end of a second coupling member;
universal joint means connected between said first end of said first coupling member and said first end of said second coupling member to provide axial alignment of said second end of said first coupling member with said second end of said second coupling member as said cones urge said coupling members toward axial alignment;
an annular seal interposed between said second ends of said coupling members;
means for securing said second ends of said first and said second coupling members in precise axial alignment prior to clamping said seal between said second ends of said first and said second coupling members;
means for clamping said seal between said second end of said first coupling member and said second end of said second coupling member to provide a fluid-tight seal therebetween.

* * * * *